United States Patent
Rosenzweig et al.

(10) Patent No.: US 9,938,839 B2
(45) Date of Patent: Apr. 10, 2018

(54) ARTICLES HAVING REDUCED EXPANSION AND HERMETIC ENVIRONMENTAL BARRIER COATINGS AND METHODS FOR THEIR MANUFACTURE

(71) Applicant: GENERAL ELECTRIC COMPANY, Schenectady, NY (US)

(72) Inventors: Larry Steven Rosenzweig, Clifton Park, NY (US); Reza Sarrafi-Nour, Clifton Park, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 83 days.

(21) Appl. No.: 14/211,302

(22) Filed: Mar. 14, 2014

(65) Prior Publication Data

US 2016/0003063 A1 Jan. 7, 2016

(51) Int. Cl.
*C23C 4/04* (2006.01)
*F01D 5/28* (2006.01)
(Continued)

(52) U.S. Cl.
CPC ............ *F01D 5/288* (2013.01); *C04B 41/009* (2013.01); *C04B 41/5024* (2013.01);
(Continued)

(58) Field of Classification Search
CPC .............. C04B 41/009; C04B 41/5024; C04B 41/5045; C04B 41/52; C04B 41/87;
(Continued)

(56) References Cited

U.S. PATENT DOCUMENTS 6,296,941 B1 10/2001 Eaton, Jr. et al.
6,410,148 B1 6/2002 Eaton, Jr. et al.
(Continued)

FOREIGN PATENT DOCUMENTS

EP 2284139 A2 2/2011

OTHER PUBLICATIONS

Harder et al., "In situ stress analysis of multilayer environmental barrier coatings", Powder Diffraction, vol. 24, No. 2, Jun. 2009, p. 94-98.*
(Continued)

*Primary Examiner* — Jonathan Langman
(74) *Attorney, Agent, or Firm* — John P. Darling

(57) ABSTRACT

Articles suitable for use as high-temperature machine components include a substrate and an environmental barrier coating disposed over the substrate, where the environmental barrier coating includes at least one hermetic self-sealing layer formed from a mixture including an alkaline earth metal aluminosilicate and a rare-earth silicate, and where the at least one hermetic self-sealing layer exhibits substantially no net remnant or residual expansion when subjected to high temperature heat treatment. The environmental barrier coating can further include a bondcoat disposed between the substrate and the hermetic self-sealing layer, a topcoat disposed over the hermetic self-sealing layer, and/or an intermediate layer disposed between the hermetic self-sealing layer and the bondcoat. The intermediate layer can include a barrier material that is substantially inert with respect to silica.

6 Claims, 3 Drawing Sheets

(51) Int. Cl.
*C04B 41/50* (2006.01)
*C04B 41/87* (2006.01)
*C04B 41/89* (2006.01)
*C04B 41/00* (2006.01)
*C04B 41/52* (2006.01)
*C23C 4/18* (2006.01)
*F01D 5/22* (2006.01)
*F01D 9/04* (2006.01)
*F02C 7/25* (2006.01)
*F23R 3/00* (2006.01)

(52) U.S. Cl.
CPC .......... *C04B 41/5045* (2013.01); *C04B 41/52* (2013.01); *C04B 41/87* (2013.01); *C04B 41/89* (2013.01); *C23C 4/04* (2013.01); *C23C 4/18* (2013.01); *F01D 5/225* (2013.01); *F01D 5/282* (2013.01); *F01D 5/284* (2013.01); *F01D 9/041* (2013.01); *F02C 7/25* (2013.01); *F23R 3/007* (2013.01); *F05D 2220/32* (2013.01); *F05D 2230/90* (2013.01); *F05D 2240/35* (2013.01); *F05D 2300/15* (2013.01); *F05D 2300/211* (2013.01); *F05D 2300/6033* (2013.01); *F23M 2900/05004* (2013.01)

(58) Field of Classification Search
CPC .. C04B 41/89; C23C 4/04; C23C 4/18; F01D 5/225; F01D 5/282; F01D 5/284; F01D 9/041; F02C 7/25; F23R 3/007
See application file for complete search history.

(56) References Cited

U.S. PATENT DOCUMENTS

| | | |
|---|---|---|
| 6,759,151 B1 | 7/2004 | Lee |
| 6,844,075 B1 | 1/2005 | Saak et al. |
| 7,374,818 B2 | 5/2008 | Bhatia et al. |
| 7,407,718 B2 | 8/2008 | Hazel et al. |
| 7,595,114 B2 | 9/2009 | Meschter et al. |
| 7,968,217 B2 | 6/2011 | Sarrafi-Nour et al. |
| 2007/0292624 A1 | 12/2007 | Nagaraj et al. |
| 2009/0297718 A1 | 12/2009 | Sarrafi-Nour et al. |
| 2010/0158680 A1* | 6/2010 | Kirby ................. C04B 41/009 415/200 |
| 2011/0033630 A1* | 2/2011 | Naik .................. C04B 41/52 427/452 |
| 2011/0052925 A1* | 3/2011 | Sarrafi-Nour .......... C01B 31/36 428/448 |
| 2011/0203281 A1 | 8/2011 | Sarrafi-Nour et al. |
| 2014/0037969 A1 | 2/2014 | Margolies et al. |

OTHER PUBLICATIONS

Arthur et al., "Design of Thermally Reliable Environmental Barrier Coating for a SiC/SiC Ceramic Matrix Composites", International Journal of Composite Materials, vol. 3, No. 6, 2013, pp. 191-197.*
European Search Report and Opinion issued in connection with Corresponding EP Application No. 15158921.5 dated Oct. 8, 2015.

* cited by examiner

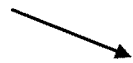

| Depositing an environmental barrier coating over a substrate, where the environmental barrier coating comprises at least one hermetic self-sealing layer formed from a mixture comprising an alkaline earth metal aluminosilicate and a rare-earth silicate | ~110 |
|---|---|
| Subjecting the at least one hermetic self-sealing layer to high temperature heat treatment in a range from about 800 degrees Celsius to about 1350 degrees Celsius for a time sufficient for at least a portion of the self-sealing layer to flow, thereby forming the article. | ~120 |

FIG. 3

ARTICLES HAVING REDUCED EXPANSION AND HERMETIC ENVIRONMENTAL BARRIER COATINGS AND METHODS FOR THEIR MANUFACTURE

The present disclosure relates to articles suitable for high-temperature machine components. More particularly, the present disclosure relates to coating systems for protecting machine components from exposure to high-temperature environments. The present disclosure also relates to methods for protecting articles.

BACKGROUND

High-temperature materials, such as, for example, ceramics, alloys, and intermetallics, offer attractive properties for use in structures designed for service at high temperatures in such applications as gas turbine engines, heat exchangers, and internal combustion engines, for example. However, the environments characteristic of these applications often contain reactive species, such as water vapor, which at high temperatures may cause significant degradation of the material structure. For example, water vapor has been shown to cause significant surface recession and mass loss in silicon-based materials. The rate of material loss is often unacceptably high for the applications.

Environmental barrier coatings (EBC's) are applied to silicon-based materials and other materials susceptible to attack by reactive species, such as high temperature water vapor; EBC's provide protection by prohibiting contact between the environment and the surface of the material. EBC's applied to silicon-based materials, for example, are designed to be relatively stable chemically in high-temperature, water vapor-containing environments. One exemplary conventional EBC system, as described in U.S. Pat. No. 6,410,148, comprises a silicon or silica bond layer applied to a silicon-based substrate; an intermediate layer comprising mullite or a mullite-alkaline earth aluminosilicate mixture deposited over the bond layer; and a top layer comprising an alkaline earth aluminosilicate deposited over the intermediate layer. In another example, U.S. Pat. No. 6,296,941, the top layer is a yttrium silicate layer rather than an alumino silicate.

The above coating systems can provide suitable protection for articles in demanding environments, but opportunities for improvement in coating performance exist to achieve higher service temperature. For instance, yttrium silicate materials, such as yttrium disilicate and yttrium monosilicate can provide capability for operation at higher temperatures, but may be prone to cracking during high temperature service. Current EBC technology generally uses plasma spray processes to deposit the coatings, primarily because of the flexibility of the process to deposit a large variety of materials, its ability to provide a wide spectrum of coating thicknesses without major process modifications, and the relative ease of depositing a coating layer. However, ceramic coatings processed by plasma spraying often contain undesirable open porosity in the form of a network of fine cracks ("microcracks") intercepting otherwise closed pores and voids. The microcrack network is formed primarily by quench and solidification cracks and voids inherent in the coating deposition process; cracks often form between layers of successively deposited material and between the individual "splats" formed when melted or partially melted particles are sprayed onto the coating surface. For EBC applications, open porosity in the coating can be detrimental. It provides a rapid path for penetration of water vapor and other gaseous species and, hence, accelerated localized deterioration of the underlying coating layers.

Various methods have been implemented to alleviate the problem of open porosity in ceramic coatings. In some applications, the coatings are applied onto a hot substrate (T>800 degrees Celsius) using plasma spray processing. Deposition on a hot substrate reduces the difference between the substrate temperature and the melting temperature of the coating material, and thus reduces the tendency for formation of quench cracks. However, extension of the hot deposition process technique to large components is challenging, owing to the high substrate temperatures and the constraints associated with manipulation of the parts and the coating hardware. In other applications, the plasma sprayed EBC coating is submitted to a post-deposition process to impregnate the non-hermetic coating structure with precursors of suitable materials, for example, soluble organic and inorganic salts and alcoxides that yield upon heat-treatment a final pore-filling material compatible with the coating matrix. The filler material blocks or restricts the pathway for water vapor penetration. Such a process is described in U.S. Pat. No. 7,595,114. Although this method is relatively easy to implement, it may require multiple impregnation-burnout cycles to achieve coating permeability improvements, and in certain cases may not provide a completely hermetic coating structure.

Many current EBC system architectures used for protection of ceramic matrix composite (CMC) components include a multi-layer coating architecture comprised of an air plasma sprayed (APS) silicon oxygen-barrier bondcoat layer onto the CMC, followed by a rare-earth disilicate coating layer followed by a barium strontium alumino silicate (BSAS) followed by another rare-earth disilicate layer and then a topcoat of yttrium monosilicate (YMS). It has been found that the rare-earth silicate coating layers applied via APS process exhibit a net expansion following a high temperature air heat treatment to crystallize the mainly amorphous as-deposited coating materials. This net expansion has been identified as a cause of cracking and interlayer separations around convex radii geometrical features of components.

Prior attempts have been made to deposit fully or almost-fully crystalline rare-earth silicate compositions using air plasma spray combined with high substrate temperature control above about 800 C. It is extremely difficult achieve and maintain such high deposition temperatures on large and complex geometrical CMC components.

Articles comprising a substrate and a self-sealing and substantially hermetic sealing layer disposed over the substrate have been described in U.S. Pat. No. 7,968,217 and in U.S. Patent Application Publication No. 2011/0052925. However, these articles are limited to particular multi-layer EBC architectures, compositions, and manufacturing processes.

Therefore, there is a need for articles protected by robust coating systems having improved capability, and simplified architectures, to serve as a barrier to water vapor and other detrimental environmental species. There is also a further need for methods to produce these articles economically and reproducibly.

The present disclosure is directed to overcoming these and other deficiencies in the art.

SUMMARY

The present disclosure provides articles suitable for use as high-temperature machine components. In one embodiment, the present disclosure provides an article comprising a substrate and an environmental barrier coating disposed over the substrate. The environmental barrier coating comprises at least one hermetic self-sealing layer formed from a mixture comprising an alkaline earth metal aluminosilicate and a rare-earth silicate. The at least one hermetic self-sealing layer exhibits substantially no net remnant or residual expansion when subjected to high temperature heat treatment.

In one embodiment, the environmental barrier coating of the article further comprises a bondcoat disposed between the substrate and the hermetic self-sealing layer.

In another embodiment, the environmental barrier coating of the article further comprises a topcoat disposed over the hermetic self-sealing layer.

In a further embodiment, the environmental barrier coating of the article further comprises an intermediate layer disposed between the hermetic self-sealing layer and the bondcoat, wherein the intermediate layer comprises a barrier material that is substantially inert with respect to silica.

The present disclosure also provides a method for making an article suitable for use as a high-temperature machine component. In one embodiment, this method comprises the steps of: providing a substrate and depositing an environmental barrier coating over the substrate, wherein the environmental barrier coating comprises at least one hermetic self-sealing layer formed from a mixture comprising an alkaline earth metal aluminosilicate and a rare-earth silicate, and wherein the at least one hermetic self-sealing layer exhibits substantially no net remnant or residual expansion when subjected to high temperature heat treatment after the depositing.

The present disclosure provides EBC architectures, systems, and methods that address the problem of the net expansion that follows a high temperature air heat treatment to crystallize the mainly amorphous as-deposited APS coating materials. As noted, this net expansion has been identified as a cause of cracking and interlayer separations around convex radii geometrical features of components. In accordance with the present disclosure, to minimize this net expansion, in various embodiments, a coating comprised of various mixtures of rare-earth silicate and alkaline earth aluminosilicate materials from 90 volume percent rare-earth silicate to 50 volume percent rare-earth silicate can be used. Dilatometry measurements on freestanding coatings showed the expansion of the coatings decreased relative to a monolithic rare-earth silicate specimen during thermal exposure. Mixtures containing less than about 90 weight percent rare-earth silicate exhibited negligible net expansion upon heatup to 1350 C and cool down to room temperature.

These and other objects, features, and advantages of the systems and methods of the present disclosure will become apparent from the following detailed description of the various aspects of the present disclosure taken in conjunction with the accompanying drawings.

BRIEF DESCRIPTION OF THE DRAWINGS

FIG. 3 is a flow chart, in accordance with aspects of the disclosure, illustrating one embodiment of a method for making an article of the present disclosure.

DETAILED DESCRIPTION

Figure 1:
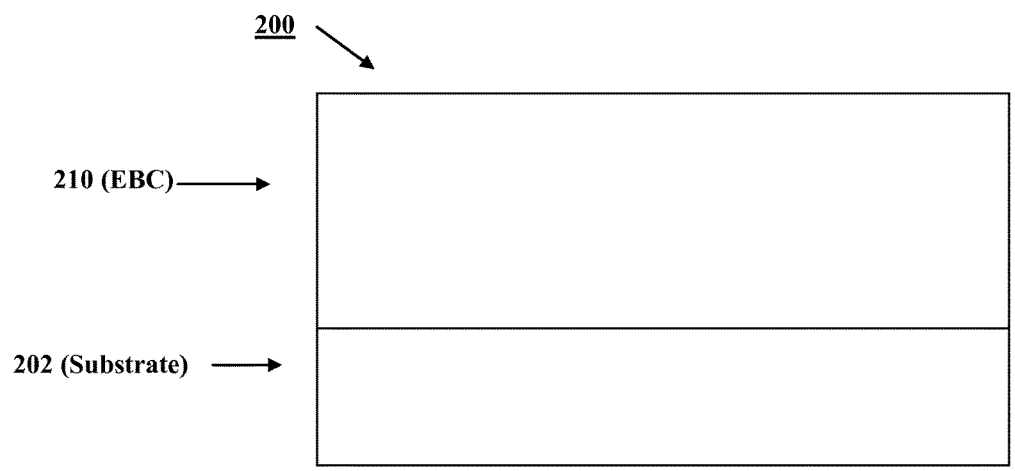
FIG. 1 is a schematic drawing of one embodiment of an article (200) of the present disclosure having a substrate (202) and an environmental barrier coating (210) disposed over the substrate.

In general, the articles, systems, and methods of the present disclosure are effective for proving a more reliable, defect-free coating system, particularly around small edge radii of blades, buckets, shrouds, or other complex ceramic matrix composite (CMC) engine components. In a more particular embodiment, the present disclosure also allows for fewer functional coating layers by effectively combining two layers together, thereby making for a more economical coating system. By also controlling the net expansion of the coating layer to near zero, the present disclosure further allows for a more rapid thermal heat treatment cycle to be utilized, which can also reduce overall coating processing times without risking cracking and delamination damage to the coating.

According to one aspect, the present disclosure provides an article suitable for high-temperature machine components. As used herein, a "high-temperature machine component" refers to any component or subcomponent of a machine that is designed for service at high temperatures, where the high temperatures can be at least 800° C., and more particularly can be between about 800° C. and about 1350° C. Examples of such machines designed for service at high temperatures can include, without limitation, gas turbine engines, heat exchangers, internal combustion engines, and the like.

In one embodiment, the article comprising a substrate and an environmental barrier coating disposed over the substrate. The environmental barrier coating comprises at least one hermetic self-sealing layer formed from a mixture comprising an alkaline earth metal aluminosilicate and a rare-earth silicate. The at least one hermetic self-sealing layer exhibits substantially no net remnant or residual expansion when subjected to high temperature heat treatment after a deposition process. In particular embodiments, subjecting the self-sealing layer to high temperature heat treatment refers to such heat treatment performed post-deposition of the at least one hermetic self-sealing layer.

As used herein, "substantially no net remnant or residual expansion" refers to a range of −0.2% to +0.2% expansion of a subject coating layer (e.g., a self-healing layer) when measured on a freestanding body of the as-deposited subject coating layer via dilatometer when it is heated for the "first time" to a temperature of <1350° C., preferably in the range of 800° C.-1350° C.

As used herein, the term "deposition process" may also be referred to herein as "depositing" or "depositing process." In addition, "disposing" of a coating over a substrate or other layer may also refer to the field of "depositing" one layer over another layer using a deposition process.

The term "self-sealing" as used herein means that at least a fraction of the coating is made of material ("sealing material") capable of forming a flowable phase, such as a liquid or a glassy phase, at or above a known temperature ("sealing temperature") that is below a melting temperature of the bulk of the coating. This liquid or glassy phase has a viscosity at the sealing temperature suitable to allow the flowable phase to flow into and at least partially fill defects such as cracks and pores, thereby enhancing the ability of the coating to block the movement of detrimental species from the external environment into the substrate. By this mechanism, the coating can seal itself; that is, it can increase its resistance to transport of detrimental species without the use of, for example, a separate sealing material deposited within pores and cracks. Thus, in some embodiments, the sealing layer is substantially free of any additional material disposed within internal surfaces of the sealing layer; this limitation, of course, does not preclude embodiments where an additional layer is disposed over the sealing layer. The term "substantially hermetic" as used herein means that the coating shows a gas permeability that is below about $2 \times 10^{-14}$ cm$^2$ (about $2 \times 10^{-6}$ Darcy), the detection limit of commonly used measurement techniques.

The fraction of the sealing layer made of the sealing material may be selected depending on a number of factors, including, for example, the expected density of defects that need to be sealed and the expected viscosity of the flowable phase. In some embodiments, this fraction is at least about 1% by volume of total sealing layer; in particular embodiments, the fraction is at least 10% by volume.

The sealing temperature typically is related to a phase transition or transformation that occurs within the sealing material. For instance, the sealing temperature may be chosen to be above a glass transition temperature for a glassy phase that forms in the sealing material. Alternatively, the sealing temperature may be chosen to be at or above a melting temperature, such as a eutectic temperature or a solidus temperature, for a particular phase or composition present in the sealing material. In some embodiments, the sealing temperature is at least about 800 degrees Celsius, and in particular embodiments, the sealing temperature is at least about 1350 degrees Celsius. In certain embodiments, the operating temperature of the article is selected to be below the sealing temperature, so that the coating will not re-form a flowable phase during service. However, there may be certain applications where having a flowable phase in the sealing layer during service is acceptable or desirable, and so embodiments of the present invention also include those where the sealing temperature is below the service temperature.

In general terms, the composition of the sealing layer is selected so that, at a given selected sealing temperature, at least a fraction of the sealing layer is either a liquid or a flowable glassy phase, as described above. The phase transformation behavior as a function of composition and temperature is well known in the art for many materials, and thus the procedure for selecting suitable materials for use in embodiments of the present invention will be apparent to practitioners based on the general descriptions presented herein. In addition to the phase transformation characteristics described above, other material characteristics such as, for instance, environmental resistance, ease of manufacture, chemical compatibility with adjacent materials, and other properties, are generally taken into account when selecting a particular material for use in a specific application.

In some embodiments, the sealing layer comprises a ceramic material, such as an oxide. For example, aluminosilicate materials may be selected because of their utility as environmental barrier coatings for use in such high temperature applications as turbomachinery components. In certain embodiments, the sealing layer comprises a rare-earth aluminosilicate. As used herein, the term "rare-earth aluminosilicate" is broadly applicable to any material that is the product of mixing or reacting at least one rare-earth oxide, silicon oxide, and aluminum oxide, and this term applies to any material having a composition that falls within a ternary isothermal section having rare-earth oxide, silicon oxide, and aluminum oxide at respective apexes. It should be noted that, the rare-earth oxide component may, in some embodiments, encompass more than one rare-earth element, thereby making the overall material a mixture or product of more than three oxides. For example, a composition made by mixing and/or reacting (1) two or more rare-earth oxides, (2) silicon oxide, and (3) aluminum oxide, is considered to be within the scope of the term "rare-earth aluminosilicate" as used herein. In some embodiments, the rare-earth aluminosilicate comprises at least one element selected from the group consisting of yttrium, scandium, gadolinium, dysprosium, holmium, erbium, thulium, ytterbium, and lutetium.

Certain rare-earth aluminosilicate compositions provide relative advantages due to their ability to form effective amounts of desirable flowable phases (i.e., liquid or glass), to resist high temperature environments, to be economically processed, or a combination of these or other factors. Generally, the silica, alumina, and rare-earth oxide are provided in relative proportions that enable the formation of a glassy phase or a liquid phase above a temperature of about 900° C. In one embodiment, the rare-earth aluminosilicate comprises up to about 62 mole % silica. In another embodiment, the rare-earth aluminosilicate comprises up to about 60 mole % alumina. In yet another embodiment, the rare-earth aluminosilicate comprises up to about 33 mole % rare-earth oxide.

In one embodiment, the article of the present disclosure includes a mixture that comprises the alkaline earth metal aluminosilicate in an amount of between about 10 volume percent and about 50 volume percent of the mixture. In another embodiment, the mixture comprises the rare-earth silicate in an amount of between about 50 volume percent and about 90 volume percent of the mixture.

In one embodiment, the alkaline earth metal aluminosilicate comprises barium strontium aluminosilicate (BSAS).

Suitable rare-earth silicates for use in the present disclosure include, without limitation, a rare-earth monosilicate and a rare-earth disilicate. Suitable rare-earth monosilicates can include, for example, yttrium monosilicate (YMS), ytterbium monosilicate (YbMS), lutetium monosilicate (LuMS), and combinations thereof.

Suitable rare-earth disilicates for use in the present disclosure include, without limitation, yttrium disilicate (YDS), ytterbium disilicate (YbDS), lutetium disilicate (LuDS), and combinations thereof such as, but not limited to, ytterbium-yttrium disilicate (YbYDS), lutetium-yttrium disilicate (LuYDS), lutetium-ytterbium-yttrium (LuYbYDS), and so on.

In one embodiment of the article of the present disclosure, the environmental barrier coating further comprises a bondcoat disposed between the substrate and the hermetic self-sealing layer. In a particular embodiment, the bondcoat comprises silicon or a metal silicide. In another embodiment, the bondcoat comprises at least one material selected from the group consisting of elemental silicon and a silicide.

In another embodiment of the article of the present disclosure, the environmental barrier coating further comprises a topcoat disposed over the hermetic self-sealing layer. Suitable topcoats can comprise at least one material selected from the group consisting of a rare-earth monosilicate and a rare-earth disilicate.

In another embodiment of the present disclosure, the environmental barrier coating further comprises an intermediate layer disposed between the hermetic self-sealing layer and the bondcoat, wherein the intermediate layer comprises a barrier material that is substantially inert with respect to silica. Suitable barrier materials can include, for example, a rare-earth disilicate. Suitable barrier materials can also include, without limitation, a yttrium disilicate and a ytterbium-yttrium disilicate, or any combinations thereof.

In one embodiment, the substrate comprises silicon. In another embodiment, the substrate comprises at least one material selected from the group consisting of silicon nitride, molybdenum disilicide, and silicon carbide. In another embodiment, the substrate comprises a ceramic matrix composite material.

Articles of the present disclosure can include components of a gas turbine assembly. In particular embodiments, the component can include, without limitation, a vane, a blade, a shroud, or a combustor component.

The present disclosure also provides a method for making an article suitable for use as a high-temperature machine component. In one embodiment, this method comprises the steps of: depositing an environmental barrier coating over a substrate, wherein the environmental barrier coating comprises at least one hermetic self-sealing layer formed from a mixture comprising an alkaline earth metal aluminosilicate and a rare-earth silicate; and subjecting the at least one hermetic self-sealing layer to high temperature heat treatment in a range from about 800 degrees Celsius to about 1350 degrees Celsius for a time sufficient for at least a portion of the self-sealing layer to flow, thereby forming the article, wherein the at least one hermetic self-sealing layer exhibits substantially no net remnant or residual expansion when subjected to said high temperature heat treatment after the depositing.

As used herein, the term 'high temperature heat treatment" refers to a heat treatment where the temperature is sufficient for at least a portion of the at least one hermetic self-sealing layer of the present disclosure to flow. Suitable temperatures for use in the "high temperature heat treatment" of the present disclosure are also described and referred to herein as the "sealing temperature."

As used herein with respect to this method, the term "depositing" can be also referred to as a "deposition process," "disposing," and the like.

In another embodiment, the step of depositing the environmental barrier coating over the substrate comprises: disposing a bondcoat over the substrate; and depositing the mixture on the bondcoat to form the at least one hermetic self-sealing layer over the bondcoat of the substrate.

In another embodiment, the step of depositing the environmental barrier coating over the substrate comprises: disposing a bondcoat over the substrate; depositing the mixture on the bondcoat to form the at least one hermetic self-sealing layer over the bondcoat of the substrate; and disposing a topcoat over the hermetic self-sealing layer.

In yet another embodiment, the step of depositing the environmental barrier coating over the substrate comprises: disposing a bondcoat over the substrate; disposing an intermediate layer over the bondcoat, wherein the intermediate layer comprises a barrier material that is substantially inert with respect to silica; and depositing the mixture on the intermediate layer to form the at least one hermetic self-sealing layer over the intermediate layer of the substrate.

Without intending to limit the scope of the present disclosure, in particular embodiments, the method involves mixing a non expanding BSAS material with an expanding rare-earth silicate material. During a heat-up and cool-down heat treatment cycle, the BSAS effectively absorbs the strain produced during the heating and crystallization of the rare-earth silicate material. Therefore, in one aspect, the present disclosure solves deficiencies in the art by making a coating layer comprised of mixtures of BSAS and rare-earth silicates so that the expansion of the resulting coating layer can be controlled. This functions to minimize or eliminate stresses induced upon the underlying coating layers of the EBC coating system during the heat treatment of the EBC after the deposition process.

Figure 2:
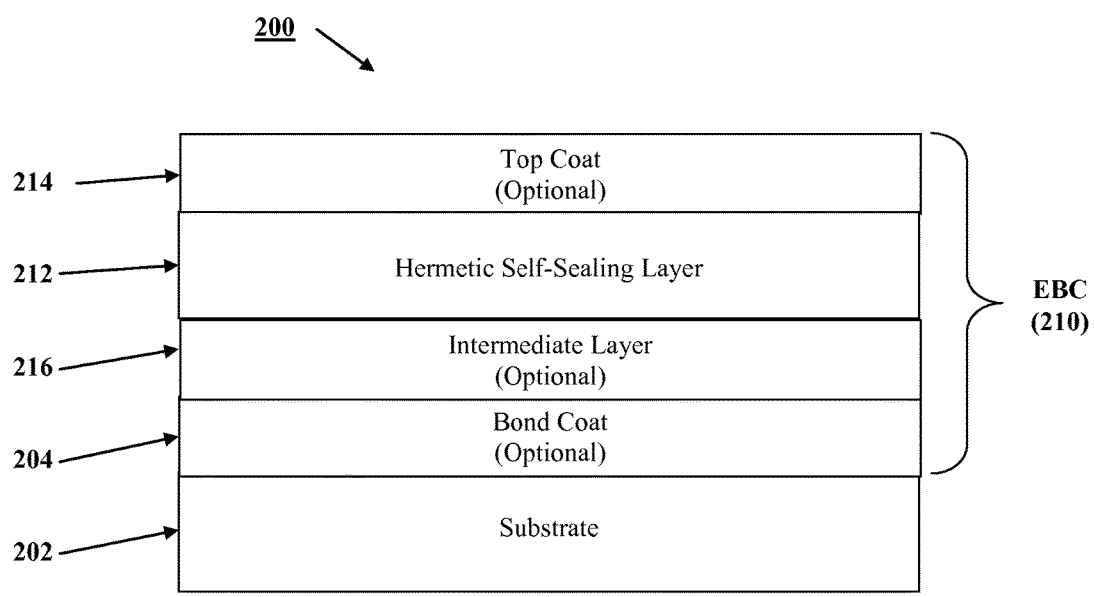
FIG. 2 is a schematic drawing of one embodiment of an article (200) of the present disclosure having a substrate (202) and an environmental barrier coating (210) disposed over the substrate. Various layers of environmental barrier coating 210 are shown, including, bondcoat 204 (optional), hermetic self-sealing layer 212, topcoat 214 (optional), and intermediate layer 216 (optional).

FIG. 1 and FIG. 2 depict exemplary articles 200 of the present disclosure. In these particular embodiments, environmental barrier coating 210 is disposed over a substrate 202. In certain embodiments, article 200 is a component of a gas turbine assembly, such as, for example, a combustion liner, transition piece, shroud, vane, or blade. The ability of the environmental barrier coating 210 to protect substrate 202 from exposure to water vapor at high temperatures may be advantageous for its application to silicon-bearing turbine components. It will be understood that although the application of embodiments of the present invention may be described with reference to applications on silicon-bearing substrates for protection against attack by water vapor, such references are exemplary and that embodiments of the present invention include substrate materials other than silicon-bearing materials.

FIG. 2 illustrates various exemplary layers that can comprise environmental barrier coating 210, as described in more detail below. Each of the depicted layers of environmental barrier coating 210 are optional, with the exception of hermetic self-sealing layer 212.

As shown in FIG. 2, in certain applications, environmental barrier coating 210 further includes bondcoat 204 disposed between substrate 202 and the hermetic self-sealing layer 212.

As shown in FIG. 2, in certain applications, environmental barrier coating 210 further includes topcoat 214 disposed over hermetic self-sealing layer 212. Topcoat 214 may be used to provide thermal insulation (a thermal barrier coating), environmental protection (an environmental barrier coating), or a combination of these functions. The selection of a suitable topcoat material will depend on the type of environment the article is to be exposed to, the composition of the underlying coatings and substrate, the cost of processing, and other factors known in the art. In some embodiments, topcoat 214 is a ceramic material. Many classes of ceramic materials are known for their ability to serve as thermal and/or environmental barrier coatings; these materials include, but are not limited to, silicates, aluminosilicates, and yttria-stabilized zirconia. In certain embodiments, topcoat 214 contains a rare-earth monosilicate and/or rare-earth disilicate; in particular embodiments, topcoat 214 is a dual-layer coating, with an outer layer of rare-earth monosilicate and an inner layer of rare-earth disilicate. The rare-earth elements associated with these monosilicate and disilicate materials, in some embodiments, may include one or more of yttrium, ytterbium, lutetium, and scandium. A particular example is where the outer layer is yttrium monosilicate and the inner layer is a rare-earth disilicate.

As shown in FIG. 2, in certain applications, environmental barrier coating 210 further includes intermediate layer 216 disposed between hermetic self-sealing layer 212 and bondcoat 204, where intermediate layer 216 comprises a barrier material that is substantially inert with respect to silica. In certain embodiment, the intermediate layer is made of a barrier material that is substantially inert with respect to silicon oxide to promote chemical stability in the coating system. "Substantially inert" means that there is at most only incidental interaction (solubility or reactivity) between silica and the barrier material. Rare-earth disilicates, such as disilicates of yttrium, ytterbium, lutetium, scandium, and other rare-earth elements, are non-limiting examples of suitable barrier materials.

The thickness of any of the various coating layers described above is generally chosen to provide adequate protection for a given service time while keeping thermal stresses to a sustainable level. Moreover, coating thickness may also be determined by the ability of a selected coating method to produce a continuous layer over the deposition area. Non-limiting examples of approximate thickness ranges for the various coatings include the following: for the sealing layer, from about 25 micrometers to about 150 micrometers; for the bondcoat, from about 75 micrometers to about 125 micrometers; for the intermediate layer, from about 50 micrometers to about 100 micrometers; for the topcoat layer, from about 50 micrometers to about 250 micrometers. For the dual-layer topcoat embodiment described above, the yttrium monosilicate outer layer can be from about 25 micrometers to about 50 micrometers in certain embodiments.

The coatings described above can be deposited using coating technology known to the art. Embodiments of the present invention are of particular interest where methods for coating deposition are used that typically result in a substantial amount of cracking and internal open porosity. Plasma spray technology and slurry-based coating processes are examples of commonly used coating methods that generate coatings with such features. In such cases, the presence of the sealing layer serves to considerably enhance the hermeticity, and thus the efficacy of protection, of the coating.

In order to activate the self-sealing nature of the sealing layer, the sealing layer is heated to the sealing temperature (described above) at which at least a portion of the sealing layer will flow; the flowable portion thus moves into cracks and pores and, upon solidification, seals off these defects that would otherwise serve as pathways for detrimental species, such as water vapor, from the environment to the substrate. Depending upon the nature of the coating, the economics of the processing, and other factors, the heating step may be performed immediately after depositing the sealing layer, after all coatings have been deposited but prior to putting the finished article into service, or even during service itself if the service temperature is allowed to be sufficiently high.

The sealing temperature is maintained for an effective time to allow time for the flowable material to reach and at least partially fill or otherwise seal off the defects. The length of time needed to achieve this is generally selected based on the number and nature of the defects to be sealed and the quantity of flowable material available in the sealing layer. In one embodiment, the sealing layer is heated to a sealing temperature in a range from about 800° C. to about 1350° C. for a time in the range from about 30 minutes to about 10 hours; in particular embodiments the time is in the range from about 30 minutes to about 4 hours. In some embodiments, the temperature is in the range from about 900° C.-1050° C. for a time in the range from about 30 minutes to about 4 hours. In other embodiments, the temperature is in the range from about 950° C.-1050° C. for a time in the range from about 30 minutes to about 4 hours, while in other embodiments the temperature is about 1350° C. for a time in this range. The heating step to seal the coating may be performed in air, vacuum, an inert atmosphere, or other environment, depending at least in part on the requirements of the materials being heated (i.e., the substrate and other coating layers, if present).

As shown in FIG. 3, in one embodiment, method 100 of the present disclosure comprises depositing an environmental barrier coating over a substrate, where the environmental barrier coating comprises at least one hermetic self-sealing layer formed from a mixture comprising an alkaline earth metal aluminosilicate and a rare-earth silicate (110). The at least one hermetic self-sealing layer to high temperature heat treatment in a range from about 800 degrees Celsius to about 1350 degrees Celsius for a time sufficient for at least a portion of the self-sealing layer to flow, thereby forming the article (120). The at least one hermetic self-sealing layer exhibits substantially no net remnant or residual expansion when subjected to said high temperature heat treatment after the depositing.

EXAMPLES

The following examples are intended to illustrate particular embodiments, but are by no means intended to limit the scope of the present systems and techniques.

Example 1

Experimental data relating to various embodiments of an article and/or method of the present disclosure is provided below in this example.

Figure 4:
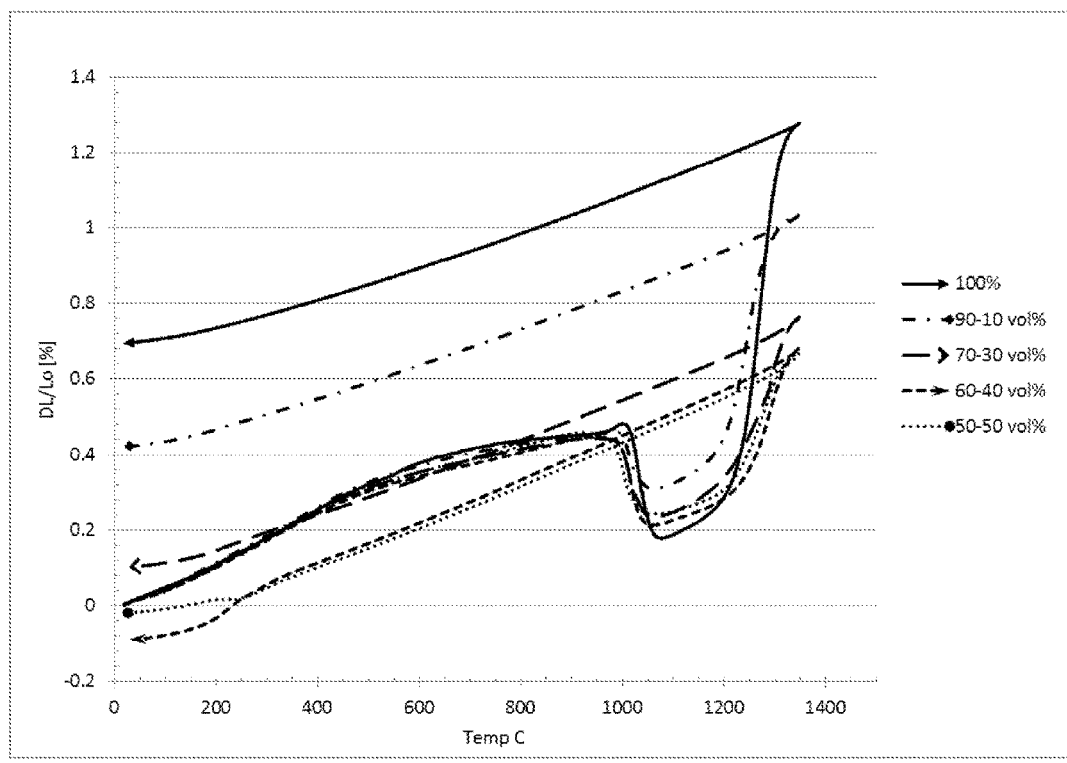
FIG. 4 is a graph showing the elongation behavior of different rare-earth silicate/BSAS composite layers fabricated by APS.

Individual freestanding monolithic coatings of about 1000-1500 microns thick were air plasma sprayed with different blended mixture ratios of ytterbium-yttrium disilicate and BSAS powders. Powders were mechanically blended with mixture ratios of 90:10, 70:30, 60:40, and 50:50 volume percent of ytterbium-yttrium disilicate:BSAS. Dilatometry measurements using a commercial dual push-rod vertical dilatometer operated in differential mode were conducted on each of the freestanding coatings produced using the different mixture ratios. As shown in FIG. 4, the net expansion after one heatup and cooldown heat treatment cycle in air from 25 degrees Celsius to 1350 degrees Celsius was close to zero percent or slightly negative for mixtures of 60:40 and 50:50, and about 0.4% for the 90:10 mixture. Typical net expansion for 100% ytterbium-yttrium disilicate coatings was between about 0.4% and about 0.7%.

Example 2

Experimental data relating to various embodiments of an article and/or method of the present disclosure is provided below in this example.

Multi-layered coating assemblies were deposited by air plasma spray onto silicon carbide ceramic matrix composite substrates. One specimen was coated with a first layer of about 100 microns of silicon, followed by a second layer of ytterbium-yttrium disilicate of about 200 microns, followed by a third layer of yttrium monosilicate of about 50 microns. A second specimen was coated with a first layer of about 100 microns of silicon, followed by second layer of ytterbium-yttrium disilicate of about 50 microns, followed by a third layer produced from a 60:40 mixture of ytterbium-yttrium disilicate:BSAS of about 150 microns, followed by a forth layer of yttrium monosilicate of about 50 microns. A third specimen was coated similarly to the second specimen, except with the third layer produced from a 50:50 volume percent mixture The three specimens were heat treated in air for 10 hrs at 1315 degrees Celcius. Following heat treatment, the specimens were exposed to multiple 2-hour exposure cycles in a 90% water vapor/10% oxygen environment at 1315° C. After 500 hours of exposure, the specimens were sectioned and metallographically examined for microstructural evaluation and to measure the thickness of the oxide scale formed at the interface between the silicon bond layer and the second layer. The oxide scale thickness of the first specimen was about a factor of 2 higher than that measured from the second and third specimens demonstrating improved hermeticity from the mixtures containing BSAS.

Additionally, each specimen was fabricated with about a 1500 micron convex radius on the corners prior to coating deposition. On the first specimen only, after the 500 hour exposure, there was significant separation and of the silicon bondcoat layer from the silicon carbide ceramic matrix composite substrate at the corners with severe oxidation of the substrate, demonstrating that the near zero net expansion of the mixed layers improves hermeticity and cracking resistance on convex radius geometrical features.

Although various embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. An article comprising a component of a gas turbine assembly, the article comprising:
   a substrate; and
   an environmental barrier coating disposed over the substrate,
   wherein the environmental barrier coating comprises at least one hermetic self-sealing layer formed from a mixture comprising an alkaline earth metal aluminosilicate and a rare-earth silicate, wherein the alkaline earth metal aluminosilicate comprises barium strontium aluminosilicate (BSAS) and the mixture comprises the alkaline earth metal aluminosilicate in an amount of between about 10 volume percent and about 50 volume percent of the mixture and the mixture comprises the rare-earth silicate in an amount of between about 50 volume percent and about 90 volume percent of the mixture, and the environmental barrier coating further comprises a topcoat disposed over the hermetic self-sealing layer and the topcoat comprises at least one material selected from the group consisting of a rare-earth monosilicate and a rare-earth disilicate,
   wherein the at least one hermetic self-sealing layer exhibits substantially no net remnant or residual expansion when subjected to a high temperature heat treatment,
   wherein the substrate comprises at least one material selected from the group consisting of silicon nitride, molybdenum disilicide, and silicon carbide, wherein the environmental barrier coating further comprises a bondcoat disposed between the substrate and the hermetic self-sealing layer and an intermediate layer disposed between the hermetic self-sealing layer and the bondcoat in contact with the bondcoat and the hermetic self-sealing layer, wherein the intermediate layer comprises a barrier material that is substantially inert with respect to silica and the barrier material comprises a rare-earth disilicate.

2. The article according to claim 1, wherein the barrier material is selected from the group consisting of yttrium disilicate and a ytterbium-yttrium disilicate.

3. The article according to claim 1, wherein the self-sealing layer has a thickness of 25 micrometers to 150 micrometers, the bondcoat has a thickness of 75 micrometers to 125 micrometers, and the intermediate layer has a thickness of 50 micrometers to 100 micrometers.

4. The article according to claim 3, wherein the environmental barrier coating further comprises a topcoat disposed over the hermetic self-sealing layer, the topcoat is a dual-layer coating comprising an outer layer of rare-earth monosilicate and an inner layer of rare-earth disilicate, the topcoat has a thickness of 50 micrometers to 250 micrometers, and the outer layer comprises yttrium monosilicate and has a thickness of 25 micrometers to 50 micrometers.

5. An article comprising a component of a gas turbine assembly, the article comprising:
   a substrate, wherein the substrate comprises a ceramic matrix composite material that comprises at least one material selected from the group consisting of silicon nitride, molybdenum disilicide, and silicon carbide; and
   an environmental barrier coating disposed over the substrate, wherein the environmental barrier coating comprises
      at least one hermetic self-sealing layer formed from a mixture comprising an alkaline earth metal aluminosilicate and a rare-earth silicate, wherein the alkaline earth metal aluminosilicate comprises barium strontium aluminosilicate (BSAS), the mixture comprises the alkaline earth metal aluminosilicate in an amount of between about 10 volume percent and about 50 volume percent of the mixture, the mixture comprises the rare-earth silicate in an amount of between about 50 volume percent and about 90 volume percent of the mixture, and the rare-earth silicate is selected from the group consisting of a rare-earth monosilicate and a rare-earth disilicate,
      a bondcoat disposed between the substrate and the hermetic self-sealing layer, wherein the bondcoat contains silicon,
      an intermediate layer disposed between the hermetic self-sealing layer and the bondcoat and in contact with the bondcoat and the hermetic self-sealing layer, wherein the intermediate layer comprises a barrier material that is substantially inert with respect to silica and the barrier material comprises a rare-earth disilicate, and
      a topcoat disposed over the hermetic self-sealing layer, wherein the topcoat comprises at least one material selected from the group consisting of a rare-earth monosilicate and a rare-earth disilicate,
   wherein the self-sealing layer has a thickness of 25 micrometers to 150 micrometers, the bondcoat has a thickness of 75 micrometers to 125 micrometers, the intermediate layer has a thickness of 50 micrometers to 100 micrometers, and the topcoat has a thickness of 50 micrometers to 250 micrometers.

6. The article according to claim 5, wherein the topcoat is a dual-layer coating comprising an outer layer of yttrium monosilicate and an inner layer of rare-earth disilicate, the outer layer has a thickness of 25 micrometers to 50 micrometers, the at least one hermetic self-sealing layer exhibits −0.2% to 0.2% expansion of the self-healing layer when subjected to heat treatment at a temperature in a range of 800° C. to 1350° C., and the hermetic self-sealing layer has a hermeticity below $2 \times 10^{-6}$ Darcy.

* * * * *